United States Patent Office 3,669,688
Patented June 13, 1972

3,669,688
COMESTIBLE STABILIZER COMPOSITION
Hal J. Thompson, Gretna, La., assignor to DCA Food Industries, Inc., New York, N.Y.
No Drawing. Filed Nov. 5, 1969, Ser. No. 874,365
Int. Cl. A23l *1/04;* A23g *3/00*
U.S. Cl. 99—139
9 Claims

ABSTRACT OF THE DISCLOSURE

A stabilizer composition, particularly useful for stabilizing comestible coatings such as sugar glazes, is formed from a major amount of malto-dextrin, and minor amounts of tapioca dextrin and gel-forming substances. The incorporation of such a composition into a glaze comprising sugar and water results in a comestible coating which is non-tacky and is resistant to extremes in ambient atmospheric conditions.

---

This invention relates generally to improvements in comestible compositions and particularly to stabilizer compositions for comestibles. More particularly, the present invention is concerned with improved coating compositions for such comestibles as fried cakes, doughnuts and the like, and to methods of producing the same.

It is well known in the prior art to apply a coating or icing composition to baked products such as fried cakes, doughnuts, and the like. Such composition should be sweet, highly palatable, attractive in appearance, easy to apply, adherent, highly stable and economical. Because of the extremes of temperature and humidity to which the coated food products are exposed during preparation, shipment and shelf storage, prior art comestible coatings have been found lacking in one or more of the desired properties for such compositions. Thus, the exposure of glazed or iced doughnuts, coated with the compositions now generally in use, to high temperature or humidity conditions results in moisture absorption which causes the coatings to weep or run on baked goods. This results in an unattractive appearance and causes the baked goods to stick to their wrappers or packages. Moreover, under other extremes of ambient conditions, conventional glaze compositions exhibit a tendency to crack or craze as well as flake off the baked goods, thereby destroying their appearance and reducing their salability.

It is an object of the present invention to provide an improved comestible composition.

It is another object of the present invention to provide a stabilizer composition, particularly for use with coating compositions which provides a thin, non-permeable coating for baked or fried goods.

A further object of the present invention is to provide a stabilizer composition for coating compositions having a high degree of moisture resistance and a high degree of stability.

The above and other objects of the present invention are accomplished by incorporating a novel stabilizing composition comprising a major amount of malto-dextrin and minor amounts of tapioca dextrin and gel-forming materials such as gelatin and agar agar into conventional high sugar solids glazes or icings for comestibles. It has now been discovered that such stabilizer compositions provide comestible glazes or icings having unusually high gloss coatings which will not flake or crack under extremes in ambient conditions and which have a minimum tendency to weep or run. Moreover, the addition of such stabilizers to conventional glazes results in a thin, non-permeable moisture and air barrier which not only improves the appearance of the comestible coating but also minimizes the exposure of the underlying comestible to the ambient atmosphere thereby improving its shelf life.

The stabilizer composition contemplated by the present invention may include the following ingredients, the weight percent range given with each material representing the broadest and preferred ranges of amounts of each material:

| Ingredient | Broad range, percent | Preferred range, percent |
| --- | --- | --- |
| Malto-dextrin | 10–100 | 50–90 |
| Topioca dextrin | 0.1–40 | 0.5–20 |
| Agar agar | 0.1–5 | 0.5–3 |
| Gelatin | 0.1–25.0 | 0.2–5 |
| Gum | 0.0–2.0 | 0.05–1 |
| Dextrose | 0–30 | 1–20 |

The malto-dextrins contemplated for use in the stabilizer composition of the present invention include all hydrolyzed cereal solids such as corn syrup solids having a dextrose equivalent of 20 or less. Particularly preferred malto-dextrins are those material having lower dextrose equivalents, for example in the range of 10–13. It has been discovered that these malto-dextrins exhibit an extremely low rate of moisture absorbtion and due to their high molecular weight, inhibit sugar crystalization which leads to cracking and crazing. Moreover, the preferred malto-dextrins exhibit a more rapid setting time, thereby reducing dripping and sticking, and result in a clear, brilliant glaze.

The other ingredients of the novel stabilizer composition are selected to provide a relatively low viscosity, elastic thermally irreversible gel and a wide variety of materials and concentrations may be employed for this purpose. It has been discovered that the utilization of tapioca dextrin is significantly superior to the commonly used gums since it has a relatively low viscosity which improves the setting characteristics of the coating composition. Moreover, it results in a non-tacky glaze. In addition to tapioca dextrin, other ingredients of the stabilizer composition such as agar agar and gelatin may be employed to enhance the appearance and coating characteristics of the coating composition. Optionally minor amounts of gums may also be employed to increase the gel strength. For example, any natural or artificial gum which will influence the gelling properties of agar agar may be employed in the composition. Typical gums include locust bean gum, guar seed gum, gum acacia, gum tragacanth and the like. Modified sea weed gums such as modified carrageenan and algins may also be employed. These modified sea weed gums may also be employed in lieu of agar.

The utilization of dextrose in the stabilizer composition is optional and a variety of other sugars may be used in lieu of dextrose, for example, lactose, sucrose or combinations thereof either alone or with dextrose. In addition, natural or artificial flavors and/or colors may be added as desired.

The stabilizer composition of the present invention may be prepared as a dry mix which is incorporated into the glaze composition at the time of its preparation. Typical glaze compositions have a high sugar solids content for example, 3 to 40 parts of water per 100 parts of sugar. Ordinarily, the sugar employed in such compositions is powdered sugar although the present invention makes possible the utilization of regular granular sugar in lieu of powdered sugar.

The concentration of malto-dextrin in the final glaze composition is a critical feature of the invention. It has been found that malto-dextrin should be present in amounts ranging from 0.1 wt. percent to 30 wt. percent, preferably 3 to 10 wt. percent, based on the amount of sugar in the glaze composition. The desired amount of malto-dextrin in the stabilized composition may therefore be obtained by incorporating approximately 0.1 to 40 parts of the stabilizer composition in the glaze.

In a typical procedure for preparing and applying a glaze composition to a comestible the desired amount of water is brought to a boil and the heretofore described stabilizer composition is added to the boiling water. Sugar is then slowly added to the above mixture with stirring and stirring continued for at least 12 minutes and preferably 15 to 20 minutes, to insure thorough distribution of the stabilizer composition in the glaze. The glaze is then applied to the comestible, such as a fried cake or doughnut, at a temperature approximating the temperature of the comestible. Thus, when a glaze is applied to doughnuts as they leave a fryer, the glaze temperature is adjusted to account for the cooling which occurs between the time that the doughnut emerges from the fryer and is conveyed to a glazing or coating station. Typical glaze application temperatures will be in a range of 100 to 160° F.

The invention will be further understood by reference to the following illustrative example:

EXAMPLE 1

A powdered stabilizer composition is prepared by mixing 76.92 parts by weight of malto-dextrin with 1.44 parts tapioca-dextrin, 1.44 parts powdered agar, 1.67 parts of 175 Bloom gelatin, 0.48 part locust bean gum and 18.05 parts dextrose. 6.5 pounds of the above composition were added to 28 pounds of boiling water and thoroughly mixed. 100 pounds of 6X powdered sugar were slowly added to the boiling mixture of stabilizer composition and water and mixing was continued for 12 minutes. The final glaze composition prepared in this manner comprised 5 wt. percent malto-dextrin based upon sugar content.

Fried doughnuts emerging from a fryer at a temperature of 385° F. were conveyed from the fryer to a glazing station. The time of travel was approximately 60–70 seconds during which time the doughnuts cooled to a temperature of approximately 140° F. The glaze composition was maintained at approximately 140° F. and was applied to the fried doughnuts. The doughnuts were permitted to cool for a period of 30 to 45 minutes and were then conveyed to packaging stations in accordance with conventional techniques.

The resulting doughnuts had a thin, non-tacky, high-gloss coating.

Having thus described the general nature, as well as specific embodiments of the invention, the true scope will now be pointed out in the appended claims.

What is claimed is:

1. A comestible stabilizer composition consisting essentially of 50 to 90 wt. percent malto-dextrin, 0.1 to 40 wt. percent tapioca dextrin, and 0.1 to 30 wt. percent gel-forming materials.

2. The composition of claim 1 wherein said gel-forming materials are selected from the group consisting of agar agar, gelatin and combinations thereof.

3. The composition of claim 1 wherein said gel-forming material is 0.1 to 5 wt. percent agar agar.

4. The composition of claim 1 wherein said gel-forming material is 0.1 to 25 wt. percent gelatin.

5. A comestible stabilizer composition consisting essentially of 50 to 90 wt. percent malto-dextrin, 0.1 to 40 wt. percent tapioca dextrin, 0.1 to 5 wt. percent agar agar and 0.1 to 25 wt. percent gelatin.

6. A stabilized comestible coating comprising 100 parts sugar, 3 to 40 parts water and 0.1 to 40 parts of a stabilizer composition consisting essentially of 50 to 90 wt. percent malto-dextrin, 0.1 to 40 wt. percent tapioca dextrin and 0.1 to 30 wt. percent gel-forming materials.

7. The composition of claim 6 wherein said malto-dextrin has a dextrose equivalent of less than 20.

8. The composition of claim 6 wherein said gel-forming materials are selected from the group consisting of agar agar, gelatin and combination thereof.

9. The composition of claim 6 wherein said gel-forming materials comprise 0.1 to 5.0 wt. percent agar agar and 0.1 to 25 wt. percent gelatin.

References Cited

UNITED STATES PATENTS 3,318,706   5/1967   Fast _____ 99—83

RAYMOND N. JONES, Primary Examiner

J. R. HOFFMAN, Assistant Examiner

U.S. Cl. X.R.

99—86, 92, 166; 106—126, 205